(12) United States Patent
Buchholtz

(10) Patent No.: US 12,097,584 B2
(45) Date of Patent: Sep. 24, 2024

(54) CUTTING FLUID CATCH MECHANISM

(71) Applicant: Bradley R. Buchholtz, Lake Mills, WI (US)

(72) Inventor: Bradley R. Buchholtz, Lake Mills, WI (US)

( * ) Notice: Subject to any disclaimer, the term of this patent is extended or adjusted under 35 U.S.C. 154(b) by 0 days.

(21) Appl. No.: 17/848,646

(22) Filed: Jun. 24, 2022

(65) Prior Publication Data

US 2023/0415290 A1    Dec. 28, 2023

(51) Int. Cl.
*B23Q 11/00* (2006.01)
*F16N 31/00* (2006.01)

(52) U.S. Cl.
CPC ...... *B23Q 11/0053* (2013.01); *B23Q 11/0067* (2013.01); *F16N 31/006* (2013.01); *Y10T 409/304088* (2015.01)

(58) Field of Classification Search
CPC ........ Y10T 408/44; Y10T 409/304088; B23Q 11/0042; B23Q 11/0053; B23Q 11/0067; B23Q 11/1069; B01D 35/30; B08B 17/025; F16N 31/002; F16N 31/004; F16N 31/006; B24B 57/00; B24B 57/02
USPC ............ 408/56; 409/137; 451/453; 222/108, 222/109, 110, 111; 220/560.03, 570, 571, 220/571.1, 572, 573
See application file for complete search history.

(56) References Cited

U.S. PATENT DOCUMENTS

| | | | | |
|---|---|---|---|---|
| 2,534,793 A | * | 12/1950 | Olson | A47J 47/20 4/658 |
| 5,113,558 A | * | 5/1992 | Soroka | B23Q 11/128 409/137 |
| 5,294,194 A | * | 3/1994 | Lombardo | A47L 13/52 312/308 |
| 5,558,654 A | * | 9/1996 | Hardy | A61G 13/102 128/849 |
| 5,996,983 A | * | 12/1999 | Laurenzi | A47J 47/005 269/15 |
| 9,339,907 B2 | | 5/2016 | Matsuyama | |
| 2002/0037692 A1 | * | 3/2002 | Bajo | B23Q 11/1069 451/361 |
| 2013/0199987 A1 | * | 8/2013 | Morris | B01D 35/0273 210/323.1 |

FOREIGN PATENT DOCUMENTS

| | | | | | |
|---|---|---|---|---|---|
| CN | 215919888 U | * | 3/2022 | ............ | B23Q 11/00 |
| DE | 202006013508 U1 | * | 1/2007 | ........ | B23Q 11/0053 |
| JP | H0512061 U | * | 2/1993 | ............ | B23Q 11/00 |
| WO | WO-2018047308 A1 | * | 3/2018 | ........ | B23Q 11/0053 |

* cited by examiner

Primary Examiner — Sunil K Singh
Assistant Examiner — Michael Vitale

(57) ABSTRACT

The invention relates to a device for attachment to a metalworking device or a chip conveyor designed to capture fluid used in the machining process so that the fluid can be reused. More specifically, the cutting fluid catch mechanism provides a slanted surface such that the metal swarf, the pieces of metal or debris resulting from machining operations slides down the slanted surface but the cutting fluid is captured by the catch mechanism and directed to a cutting fluid reservoir where it can be filtered and reused.

9 Claims, 6 Drawing Sheets

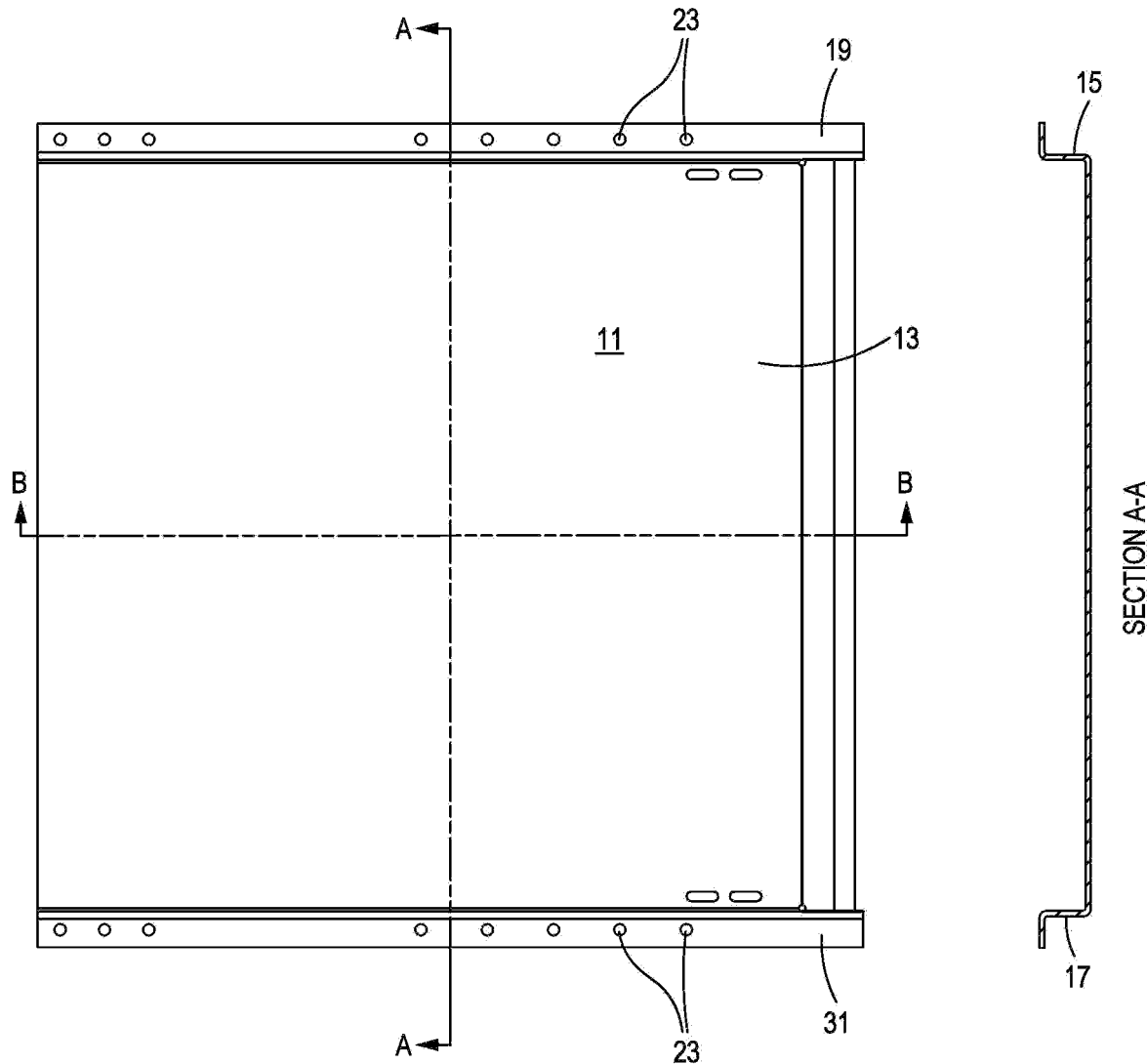
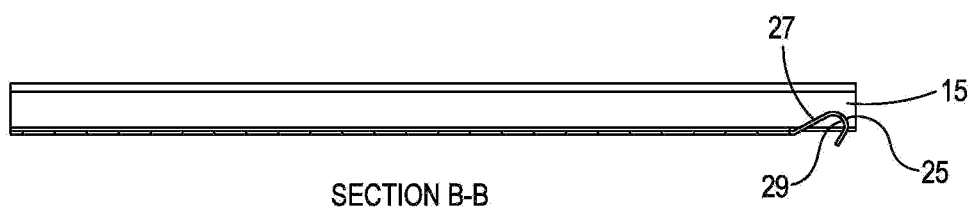
FIG. 1  FIG. 2
FIG. 3

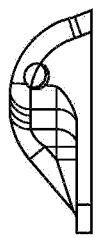
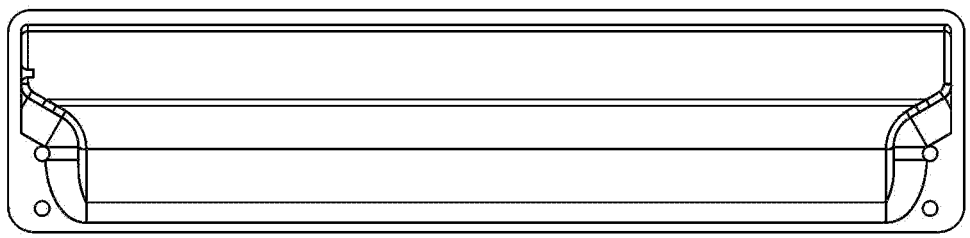
FIG. 10  FIG. 11
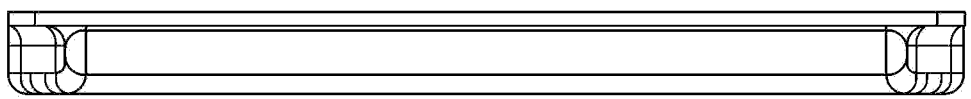
FIG. 12

CUTTING FLUID CATCH MECHANISM

FIELD OF THE INVENTION

The invention relates to an article of manufacture used to catch and recycle oil. More specifically, the invention relates to a device for attachment to a metalworking device or a chip conveyor designed to capture fluid used in the machining process so that the fluid can be reused.

BACKGROUND OF THE INVENTION

Cutting fluid is a type of coolant and lubricant designed specifically for metalworking processes, such as machining and stamping. There are various kinds of cutting fluids, which include oils, oil-water emulsions, pastes, gels, aerosols (mists), and air or other gases. Typically, cutting fluids are made from petroleum distillates, animal fats, plant oils, water and air, or other raw ingredients. Most metalworking and machining processes can benefit from the use of cutting fluid, depending on workpiece material. Cutting fluids are very important in keeping the workpiece at a stable temperature, maximizing the life of the cutting tip by lubricating the working edge, reducing tip welding and preventing rust on machine parts and cutters.

Unfortunately, most cutting fluids are wasted during the cutting process and are often discarded along with the waste chips. Recycling cutting fluids could substantially reduce costs for machining operations as well as reducing the environmental cost of disposing of waste cutting fluids. What is needed is a device that permits cutting fluids additional time to drain from the from the metal waste, or swarf.

SUMMARY OF THE INVENTION

The cutting fluid catch mechanism is attached to the discharge of a metalworking machine such as a lathe, milling machine or a drill or to a chip conveyor. The cutting fluid catch mechanism is attached to the discharge chute. The cutting fluid catch mechanism provides a slanted surface such that the metal swarf, the pieces of metal or debris resulting from machining operations slides down the slanted surface but the cutting fluid is captured by the catch mechanism and directed to a cutting fluid reservoir where it can be filtered and reused.

In the claimed embodiment the drip tray comprises a generally rectangular planar surface, the generally rectangular planar surface having a drip end, the drip end comprising a first relatively short upwardly angled section, the short upwardly angled section being angled upwardly relative to the generally rectangular planar surface and a curved section that is curved downwardly relative to the short upwardly angled section such that the curved section curves below the plane of the generally rectangular planar surface; and a drip reservoir, the drip reservoir being attachable to the generally rectangular planar surface such that a liquid flowing over the curved section of the generally rectangular planar surface enters the drip reservoir. The drip tray may further comprises a pair of generally parallel side walls that extend orthogonally in the same direction from the generally rectangular planar surface. In a further embodiment, the side walls further comprise a flange, the flange being used to attach the drip tray to a machine that emits schwarf and a liquid, such as cutting fluid.

In the claimed embodiment, the drip reservoir may further comprise a generally rectangular bottom, a pair of opposing side walls extending upwardly from the rectangular bottom, a front end wall extending generally upwardly from the rectangular bottom and a back end wall extending generally upwardly from the rectangular bottom, the opposing side walls, front end wall and back end wall being connected so as to contain a liquid. In a specific embodiment, the drip tray may further comprises a generally rectangular bottom, a pair of opposing side walls extending upwardly from the rectangular bottom, a front end wall extending generally upwardly from the rectangular bottom and a back end wall extending generally upwardly from the rectangular bottom, the opposing side walls, front end wall and back end wall being connected so as to contain a liquid and further comprising an aperture in one of the front end wall, the rear end wall or one of the opposing side walls. In a further embodiment, there is an aperture in one of the front end wall, the rear end wall or one of the opposing side walls; and a tube attached to the aperture. Generally speaking, the drip tray is removably attachable to the drip tray. Additionally, either or both of the drip tray and the drip reservoir could be metal or plastic.

In operation, the drip tray further comprises a plurality of wires, the plurality of wires being used to suspend the drip tray at an angle below an outlet of a machine that emits scrap metal and liquid. Obviously, it is not necessary to use wires, as virtually any type of material can be used to suspend the drip tray, even long screws.

BRIEF DESCRIPTION OF THE DRAWINGS

FIG. 1 is a top elevational view of the cutting fluid collection tray.

FIG. 2 is a sectional view of the cutting fluid collection tray along line A-A of FIG. 1.

FIG. 3 is a sectional view of the cutting fluid collection tray along line B-B of FIG. 1.

FIG. 10 is a side elevational cutaway view of the drip reservoir shown in FIG. 9.

FIG. 11 is a top elevational view of the drip reservoir shown in FIG. 9

FIG. 12 is an end elevational view of the drip reservoir shown in FIG. 9.

DETAILED DESCRIPTION OF THE INVENTION

Figure 13:
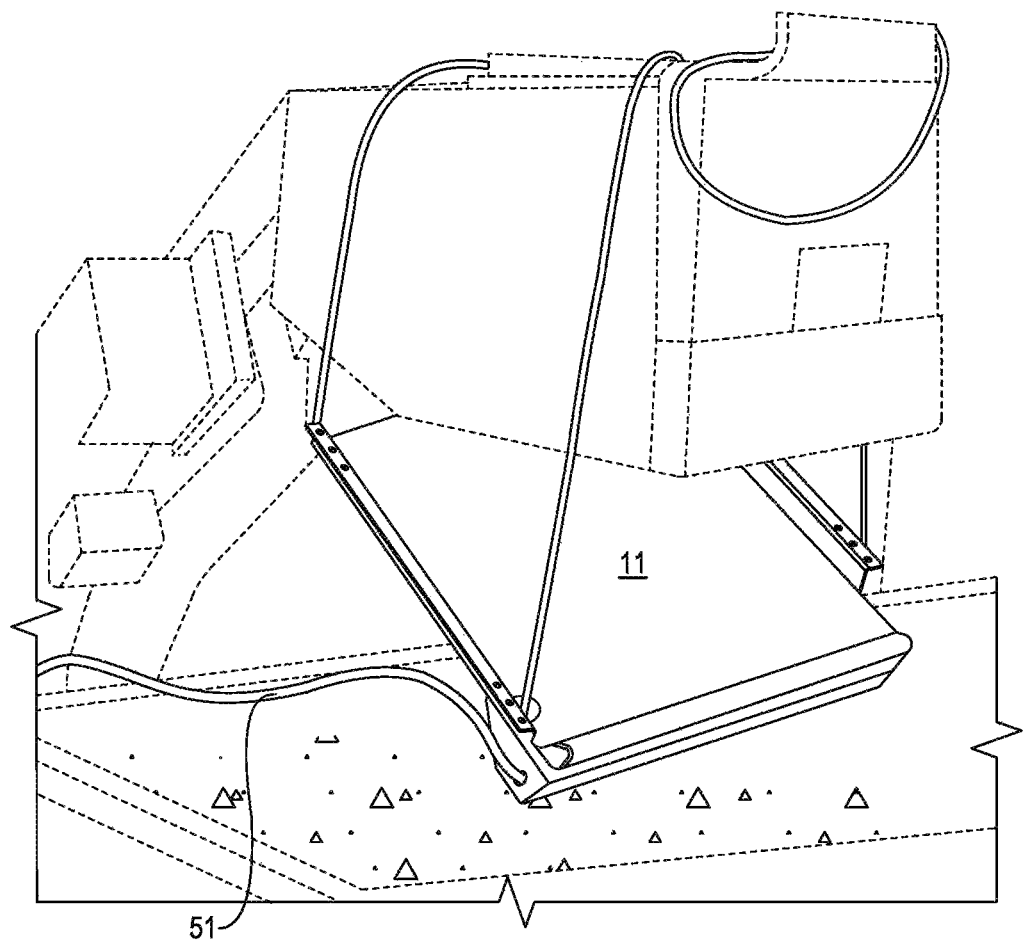
FIG. 13 shows the claimed drip tray as installed on a machine.

Now referring to the drawings in detail, wherein like reference numerals refer to like elements throughout, FIG. 1 shows a top elevational view of drip tray 11. Drip tray 11 comprises a planar rectangular surface 13, a pair of side walls 15, 17 shown in FIG. 2 and FIG. 3 protruding upwardly from the planar rectangular surface 13 and a flange 19, 21 extending outwardly from each of the pair of side walls 15, 17. Each flange 19, 21 may further comprise a plurality of apertures 23. Generally speaking, apertures 23 may be used to suspend the drip tray 11 from a metalworking machine or chip conveyor. Drip tray 11 further comprises a curl 25 at one end. Curl 25 is comprised of at least two sections, a first upwardly angled section 27 being angled upwardly from the generally planar rectangular surface and a downwardly curved section 29 which is curved downwardly relative to the short upwardly angled section 27 such that the short upwardly curved section 27 curves below the plane of the generally rectangular planar surface 13. As an example, as shown in FIG. 13 drip tray 11 may be suspended from the metalworking machine using wire attached via one or more of the apertures 23. Drip tray 11 is installed such that the end opposite the curl 25 is higher than the end with the curl 11 such that the cutting fluid flows downhill to the curl 25.

Figure 4:
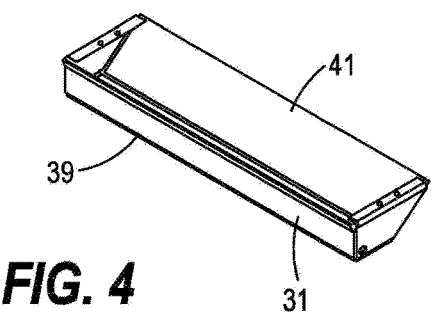
FIG. 4 is a top and side perspective view of the drip reservoir.
Figure 5:
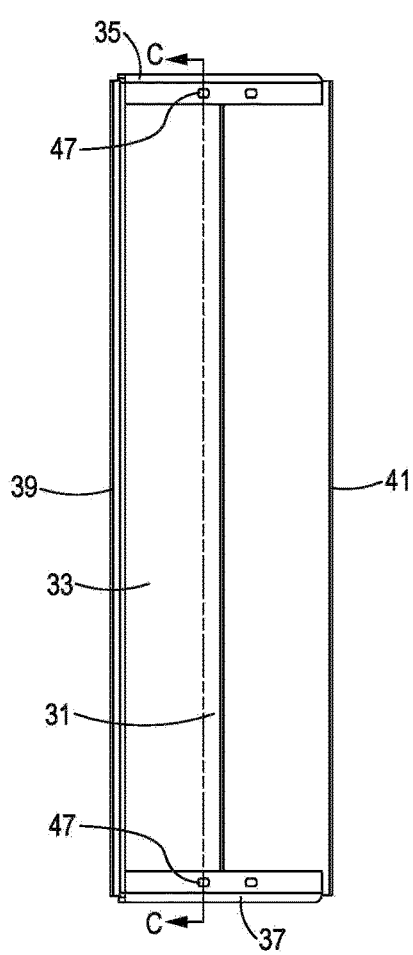
FIG. 5 is a top elevational view of the drip reservoir.
Figure 6:
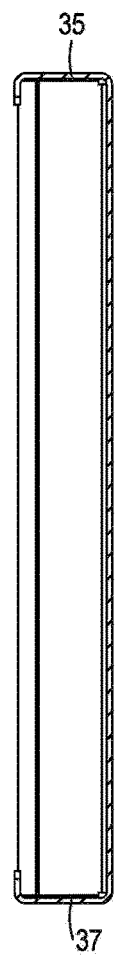
FIG. 6 is an end side elevational view of the drip reservoir.
Figure 7:
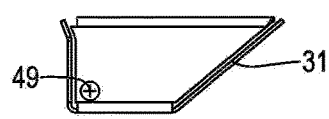
FIG. 7 is a side elevational view of the drip reservoir.
Figure 8:
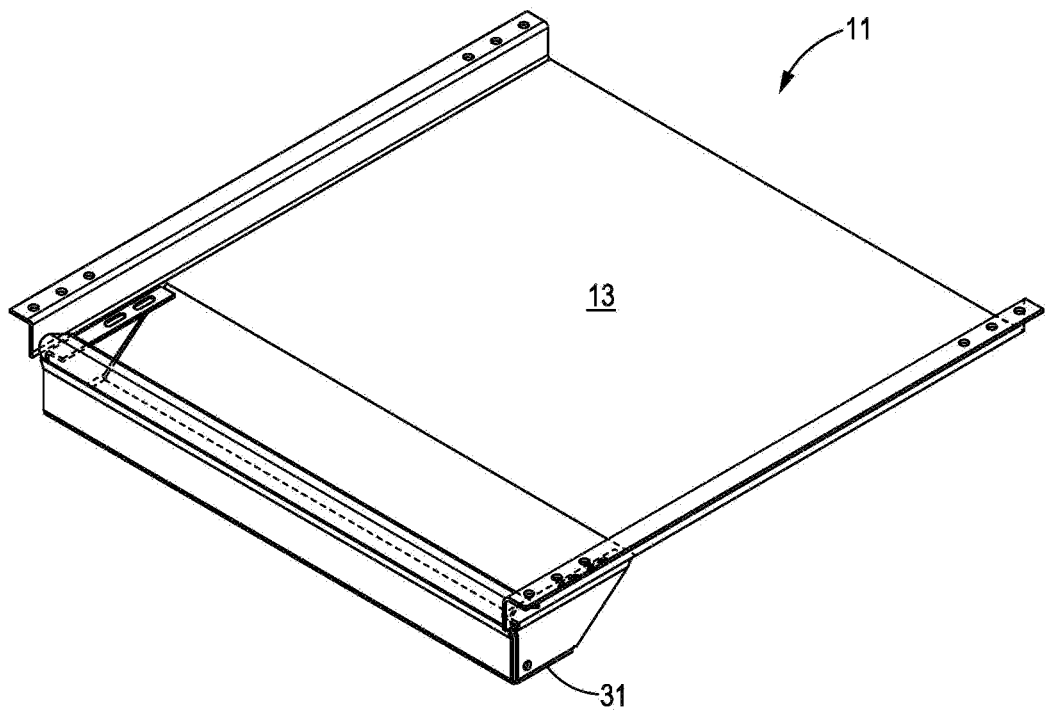
FIG. 8 is a top, side and end perspective view of the claimed invention.
Figure 9:
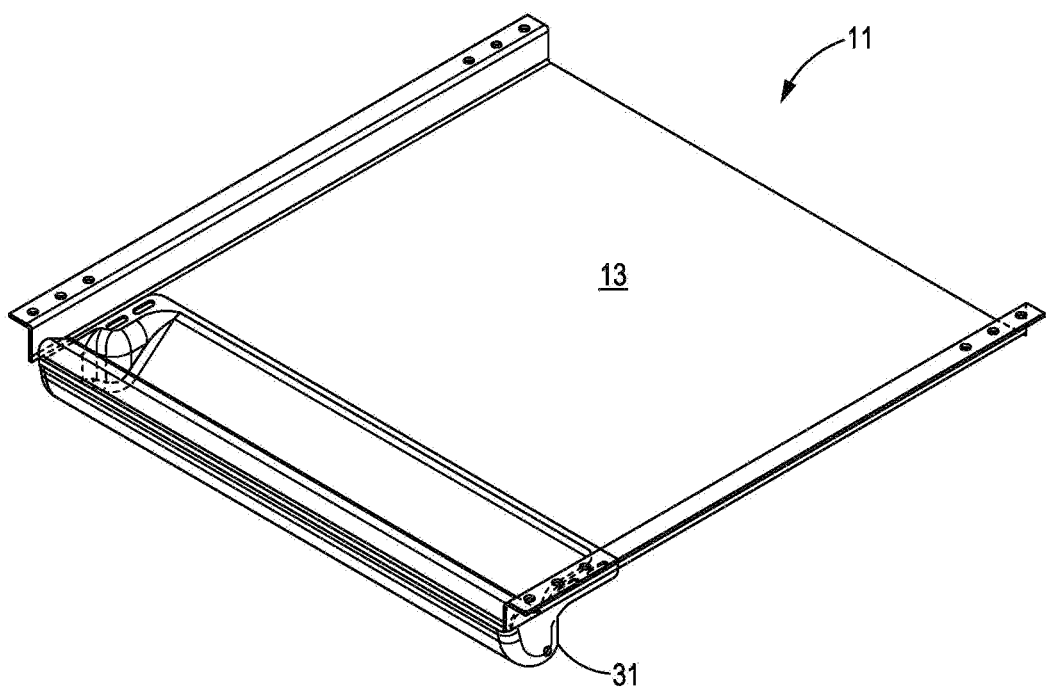
FIG. 9 is a top side and end perspective view of an additional embodiment of the claimed invention.

Referring now to FIGS. 4-7, which show several views of the drip reservoir 31. The drip reservoir 31 can be of virtually any shape provided that it collects cutting fluid that flows down the flat rectangular surface 13 of the drip tray 11 to the curl 25 in the drip tray 11. As shown in FIG. 5, drip reservoir 31 comprises a bottom surface 33, and two generally upwardly extending side walls 35, 37 and two generally upwardly extending end walls 39, 41. In the embodiment shown in FIG. 5, the upwardly extending side walls 35, 37 each further comprise a flange 43, 45. Each flange 43, 45 may further comprise apertures 47 for use in attaching drip reservoir 31 to drip tray 11. Drip reservoir 31 further comprises an aperture 49 in one of the side walls 35, 37. As shown in FIG. 13, a hose 51 can be attached aperture 49 to drain drip reservoir 31 of cutting fluid.

In operation, as metal schwarf and cutting fluid is ejected from a metalworking machine, the swarf lands on the drip tray 11. At that point the cutting fluid has the opportunity to run down the drip tray 11 and over the curl 25, where it drops in the drip reservoir 31. Metal schwarf simply slides down the drip tray 11 and over the curl 25 into a recycling bin.

Drip tray 11 is attached to drip reservoir 31 in a sliding relationship such that, if necessary, the position of the drip reservoir 31 can be adjusted relative to the drip tray 11. Depending on the installed angle of the drip tray 11, the drip reservoir 31 may need to be extended outwardly to catch cutting fluid. Steeper drip trays 11 may require a fully extended drip reservoir 31. Shallower drip trays 11 may require less extension or swarf will land in the drip reservoir 31. To permit this extension and retraction function, the drip tray 11 further comprises slots 27. Fasteners (not shown) are inserted through drip reservoir 41 apertures into slots in drip tray. When fasteners are loosened, drip reservoir 31 may be adjusted relative to drip tray 11.

Preferred embodiments of this invention are described herein. Variations of those preferred embodiments may become apparent to those of ordinary skill in the art upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutting fluid catch mechanism for attachment to a metalworking machine, the metalworking machine being operable to produce at least a quantity of swarf and a quantity of cutting fluid, the cutting fluid catch mechanism comprising:
    a drip tray comprising a rectangular planar bottom surface and a curl, the rectangular planar bottom surface having a first end and a second end that is opposite the first end and further having a pair of opposing side walls extending upwardly from the rectangular planar bottom surface, the second end connecting to the curl, the curl being comprised of two sections, a first upwardly angled section being angled upwardly from the rectangular planar bottom surface to an elevation above the rectangular planar bottom surface and a second downwardly curled section, the second downwardly curled section being curled downwardly relative to the upwardly angled section such that the second downwardly curled section curls to a level below the rectangular planar bottom surface; and
    a drip reservoir, the drip reservoir being attachable to the drip tray such that the drip reservoir is situated under the drip tray and is positioned relative to the drip tray so that the quantity of cutting fluid that slides down the drip tray and over the second downwardly curled section of the drip tray drops into the drip reservoir.

2. The cutting fluid catch mechanism of claim 1, wherein each side wall of the pair of opposing side walls further comprises a respective flange.

3. The cutting fluid catch mechanism of claim 1, wherein the drip reservoir further comprises:
    a rectangular bottom,
    a pair of opposing side walls extending upwardly from the rectangular bottom,
    a first end wall extending upwardly from the rectangular bottom, and
    a second end wall extending upwardly from the rectangular bottom,
    wherein the opposing side walls, the first end wall, and the second end wall are connected so as to be operable to catch and contain the quantity of cutting fluid.

4. The cutting fluid catch mechanism of claim 1, wherein the drip reservoir further comprises:
    a rectangular bottom,
    a pair of opposing side walls extending upwardly from the rectangular bottom,
    a first end wall extending upwardly from the rectangular bottom, and
    a second end wall extending upwardly from the rectangular bottom,
    wherein the opposing side walls, the first end wall, and the second end wall are connected so as to be operable to catch and contain the quantity of cutting fluid, and
    wherein the drip reservoir further comprises an aperture in one of the first end wall, the second end wall, and one of the opposing side walls.

5. The cutting fluid catch mechanism of claim 1, wherein the drip reservoir further comprises:
    a rectangular bottom,
    a pair of opposing side walls extending upwardly from the rectangular bottom,
    a first end wall extending upwardly from the rectangular bottom, and
    a second end wall extending upwardly from the rectangular bottom,
    wherein the opposing side walls, the first end wall, and the second end wall are connected so as to contain the quantity of cutting fluid, and
    wherein the drip reservoir further comprises an aperture in one of the first end wall, the second end wall, and one of the opposing side walls, and
    wherein a tube is attached to the aperture.

6. The cutting fluid catch mechanism of claim 1, wherein the drip reservoir is removably attached to the drip tray.

7. The cutting fluid catch mechanism of claim 1, wherein the drip reservoir is made of plastic.

8. The cutting fluid catch mechanism of claim 1, wherein the drip reservoir is attached to drip tray such that the position of the drip reservoir can be adjusted relative to the drip tray.

9. A cutting fluid catch mechanism for attachment to a metalworking machine, the metalworking machine being operable to produce at least a quantity of swarf and a quantity of cutting fluid, the cutting fluid catch mechanism comprising:

a drip tray comprising a rectangular planar bottom surface and a curl, the rectangular planar bottom surface having a first end and a second end that is opposite the first end and further having a pair of opposing side walls extending upwardly from the rectangular planar bottom surface, the second end connecting to the curl, the curl being comprised of two sections, a first upwardly angled section being angled upwardly from the rectangular planar bottom surface to an elevation above the rectangular planar bottom surface and a second downwardly curled section, the second downwardly curled section being curled downwardly relative to the upwardly angled section such that the second downwardly curled section curls to a level below the rectangular planar bottom surface, the drip tray being positioned such that the quantity of swarf and the quantity of cutting fluid on the drip tray run or slide down the drip tray; and a drip reservoir, the drip reservoir being attachable to the drip tray such that the drip reservoir is situated under the drip tray and is positioned relative to the drip tray so that the quantity of cutting fluid that slides down the drip tray and over the second downwardly curled section of the drip tray drops into the drip reservoir, wherein the quantity of swarf passes over the curl and lands in a position outside of the drip reservoir and wherein the position of the drip reservoir is adjustable relative to the drip tray.

\* \* \* \* \*